United States Patent
Jeong et al.

(10) Patent No.: US 9,897,748 B2
(45) Date of Patent: Feb. 20, 2018

(54) DISPLAY DEVICE

(71) Applicant: LG DISPLAY CO., LTD., Seoul (KR)

(72) Inventors: Young Hun Jeong, Paju-si (KR); Sang Hyun Ahn, Paju-si (KR); Yong Ik Hwang, Paju-si (KR); Hee Kyung Lee, Seoul (KR); Young Kyu Bang, Goyang-si (KR); Jin Seo Park, Seoul (KR); Chi Yong Kim, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 2 days.

(21) Appl. No.: 14/567,897

(22) Filed: Dec. 11, 2014

(65) Prior Publication Data

US 2015/0168640 A1 Jun. 18, 2015

(30) Foreign Application Priority Data

Dec. 12, 2013 (KR) .......................... 10-2013-0154362

(51) Int. Cl.
*G02F 1/1333* (2006.01)
*F21V 8/00* (2006.01)

(52) U.S. Cl.
CPC ..... *G02B 6/0088* (2013.01); *G02F 1/133308* (2013.01); *G02B 6/0038* (2013.01); *G02B 6/0043* (2013.01); *G02B 6/0051* (2013.01); *G02B 6/0058* (2013.01); *G02F 2001/133317* (2013.01)

(58) Field of Classification Search
CPC ............... G02F 1/133308; G02F 2001/133317
USPC ......................................................... 349/58
See application file for complete search history.

(56) References Cited

U.S. PATENT DOCUMENTS

| 5,929,950 | A | * | 7/1999 | Matsuda | G02F 1/133308 |
| | | | | | 349/58 |
| 6,549,263 | B1 | * | 4/2003 | Kim | G02F 1/133308 |
| | | | | | 349/58 |
| 2003/0169383 | A1 | | 9/2003 | Kim | |
| 2004/0257484 | A1 | | 12/2004 | Ishitaka et al. | |
| 2005/0024891 | A1 | | 2/2005 | Tsai et al. | |
| 2007/0046874 | A1 | | 3/2007 | Adachi et al. | |
| 2008/0100769 | A1 | * | 5/2008 | Hsiao | G02F 1/133308 |
| | | | | | 349/58 |
| 2009/0027584 | A1 | * | 1/2009 | Han | G02F 1/133608 |
| | | | | | 349/58 |
| 2011/0090422 | A1 | | 4/2011 | Hamada | |
| 2011/0261284 | A1 | * | 10/2011 | Hong | G02F 1/133308 |
| | | | | | 349/58 |
| 2012/0257417 | A1 | * | 10/2012 | Lee | G02B 6/005 |
| | | | | | 362/622 |
| 2012/0307180 | A1 | | 12/2012 | Wang et al. | |
| 2013/0077347 | A1 | | 3/2013 | Hsu et al. | |
| 2014/0043558 | A1 | * | 2/2014 | Hwang | G02B 6/0095 |
| | | | | | 349/58 |

(Continued)

FOREIGN PATENT DOCUMENTS

CN 1444071 A 9/2003
CN 101939585 A 1/2011

(Continued)

*Primary Examiner* — Thanh-Nhan P Nguyen
(74) *Attorney, Agent, or Firm* — Birch, Stewart, Kolasch & Birch, LLP

(57) ABSTRACT

Discussed is a display device. The display device can include an optical frame, which provides light up to an edge of a display panel, thereby enlarging an active area of the display device.

15 Claims, 10 Drawing Sheets

(56) References Cited

U.S. PATENT DOCUMENTS

2015/0049508 A1    2/2015  Suzuki et al.

FOREIGN PATENT DOCUMENTS

| CN | 102402065 A | 4/2012 |
|---|---|---|
| EP | 2 840 441 A1 | 2/2015 |
| TW | M294665 U | 7/2006 |
| TW | M337085 A | 7/2008 |
| TW | M353375 U | 3/2009 |
| TW | 201122666 A1 | 7/2011 |
| TW | 201250298 A1 | 12/2012 |
| TW | 201314302 A1 | 4/2013 |
| TW | 201316085 A1 | 4/2013 |
| WO | WO 2008/130621 A1 | 10/2008 |

* cited by examiner

DISPLAY DEVICE

CROSS-REFERENCE TO RELATED APPLICATIONS

This application claims the benefit of the Korean Patent Application No. 10-2013-0154362 filed on Dec. 12, 2013, which is hereby incorporated by reference as if fully set forth herein.

BACKGROUND OF THE INVENTION

Field of the Invention

The present invention relates to a display device.

Discussion of the Related Art

FIG. 1 illustrates a related art liquid crystal display (LCD) device 10. The LCD device 10, as shown in FIG. 1, includes a liquid crystal panel 11, a backlight unit 12 providing light toward the liquid crystal panel 11, a guide panel 13 which is coupled to the backlight unit 12 along an outer circumference of the backlight unit 12 and supports the liquid crystal panel 11, and a case top 14 surrounding an edge of the liquid crystal panel 11.

More specifically, the backlight unit 12 may include a light source 12a which is configured with light emitting diode (LED) array, a light guide panel 12b, a reflection member 12c, a plurality of optical sheets 12d, and a cover bottom 12e.

However, since the light source 12a is disposed inward into an area corresponding to a structure such as the guide panel 13 or the case top 14, it is difficult to realize a narrow bezel.

Also, since a mechanism for fixing the optical sheet 12d should be separately provided, a bezel which is a non-active area increases.

Moreover, an active area A/A of a liquid crystal display device 10 is reduced due to a structure such as the guide panel 13 or the case top 14.

SUMMARY OF THE INVENTION

Accordingly, the present invention is directed to provide a display device that substantially obviates one or more problems due to limitations and disadvantages of the related art.

An aspect of the present invention is directed to provide a display device including an optical frame, which provides light to an edge of a display panel, thereby enlarging an active area of a display device.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device comprising: a display panel; a backlight unit providing light in a direction of the display panel; and an optical frame supporting the display panel and providing light transferred from the backlight unit to a whole area of the display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
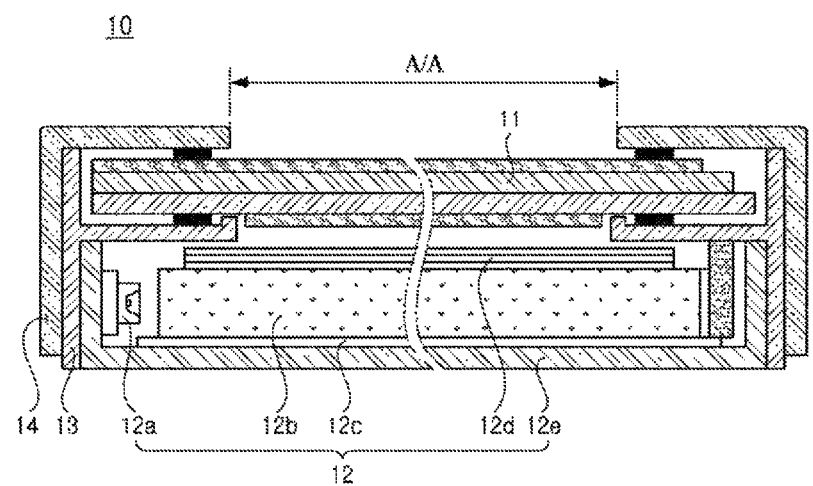
FIG. 1 is a sectional view of a related art LCD device.

Reference will now be made in detail to the exemplary embodiments of the present invention, examples of which are illustrated in the accompanying drawings. Wherever possible, the same reference numbers will be used throughout the drawings to refer to the same or like parts. The objects, advantages, and new features of the present invention will be clarified in detail through embodiments described hereinafter in conjunction with the accompanying drawings.

In the specification, in adding reference numerals for elements in each drawing, it should be noted that like reference numerals already used to denote like elements in other drawings are used for elements wherever possible. Terms like a first and a second may be used to describe various elements, but the elements should not be limited by the terms. The terms may be used only as object for distinguishing an element from another element. In the following description, when the detailed description of the relevant known function or configuration is determined to unnecessarily obscure the important point of the present invention, the detailed description will be omitted.

Hereinafter, embodiments of the present invention will be described in detail with reference to the accompanying drawings.

The display device according to an embodiment of the present invention includes a display panel, a backlight unit providing light in a direction of the display panel and an optical frame supporting the display panel and providing light transferred from the backlight unit to a whole area of the display panel.

The optical frame is formed of any one of polycarbonate (PC), polymethylmethacrylate (PMMA), polystyrene (PS), poly ethylene terephtalate (PET), or meta styrene (MS).

The optical frame includes a diffusion bead.

The backlight unit includes a light source part, a light guide panel providing light, transferred from the light source, toward the display panel, an optical sheet part coupled to one side of the light guide panel and configured to direct or diffuse the light, and a case configured to include an accommodating part, which accommodates the light source part, the light guide panel and the optical sheet part, and a side part which extends in a direction from the accommodating part to the display panel.

The light guide panel includes a light receiving part facing the light source part, wherein the light is incident on the light receiving part, a non-light receiving part that does not face the light source part and a light outputting part providing the light toward the display panel.

The optical frame includes a panel supporting part coupled to the side part of the case and configured to support the display panel and a light diffusion part configured to extend from the panel supporting part and cover an edge of the light outputting part, wherein the optical frame provides the light to a whole area of the display panel.

The panel supporting part includes a horizontal plane for supporting the display panel.

In the light guide panel, a plurality of groove patterns are disposed in a portion of the light outputting part corresponding to the light diffusion part provided in a direction of the light receiving part.

The groove pattern is disposed in a portion of the light outputting part to be parallel to an arrangement direction of the light source part.

A micro pattern is disposed in a lower portion of the light guide panel except a lower portion of the light guide panel in which the groove pattern is disposed.

A density of the micro patterns disposed in a lower portion, which corresponds to the light diffusion part provided in a direction of the non-light receiving part, of the light guide panel is higher than a density of the micro patterns disposed in the other portions.

Each of end parts of the light receiving part and the non-light receiving part matches an end part of the light diffusion part, or is disposed inward from the end part of the light diffusion part.

The optical frame further comprises a stepped portion provided between the panel supporting part and the light diffusion part, and the optical sheet part is coupled to the stepped portion.

In the light diffusion part, an optical pattern is disposed in one surface facing the display panel.

The display device further includes a reinforcing member coupled to the optical frame along an outer circumference of the optical frame.

Figure 2:
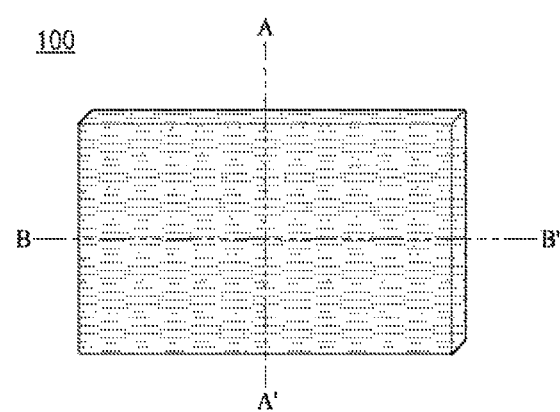
FIG. 2 is a schematic perspective view of an LCD device according to an embodiment of the present invention.
Figure 3A:
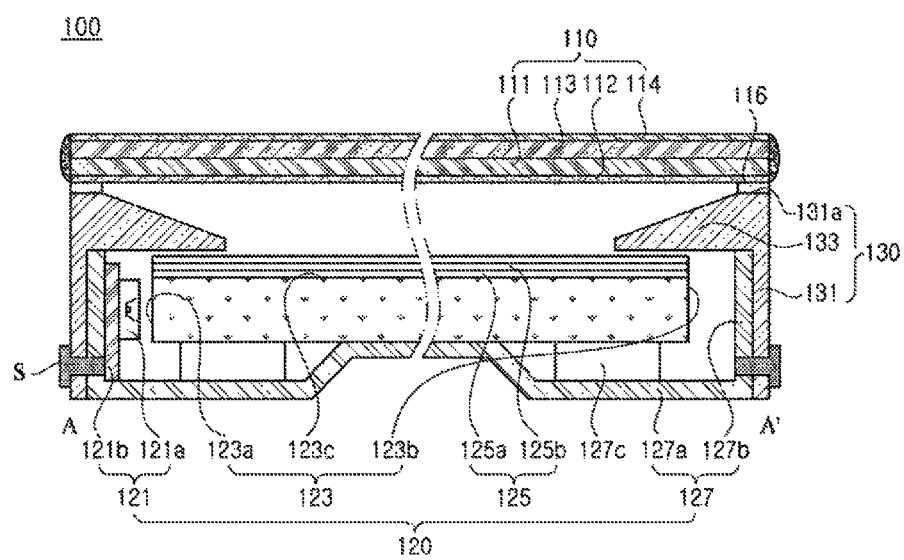
FIG. 3A is one example of a sectional view taken along line A-A' of the display device shown in FIG. 2.
Figure 3B:
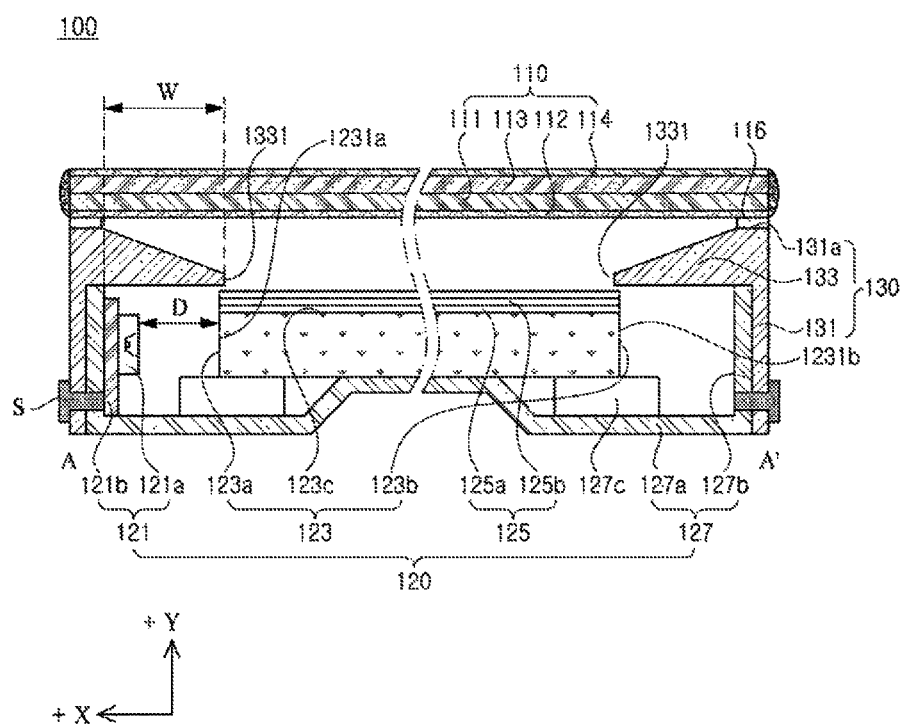
FIG. 3B is another example of a sectional view taken along line A-A' of the display device shown in FIG. 2.

FIG. 2 is a schematic perspective view of an LCD device according to an embodiment of the present invention, FIG. 3A is one example of a sectional view taken along line A-A' of the display device shown in FIG. 2, and FIG. 3B is another example of a sectional view taken along line A-A' of the display device according to another embodiment of the present invention.

Figure 4:
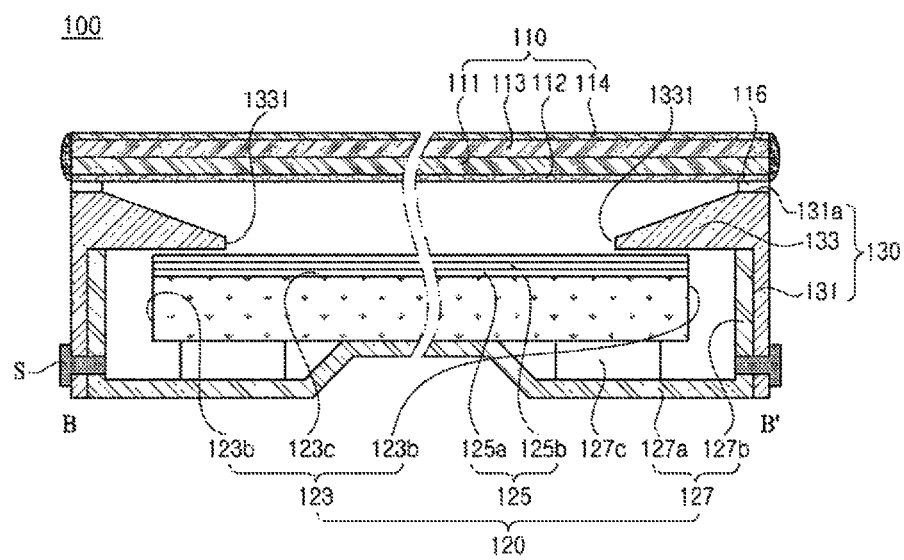
FIG. 4 is one example of a sectional view taken along line B-B' of the display device shown in FIG. 2.
Figure 5:
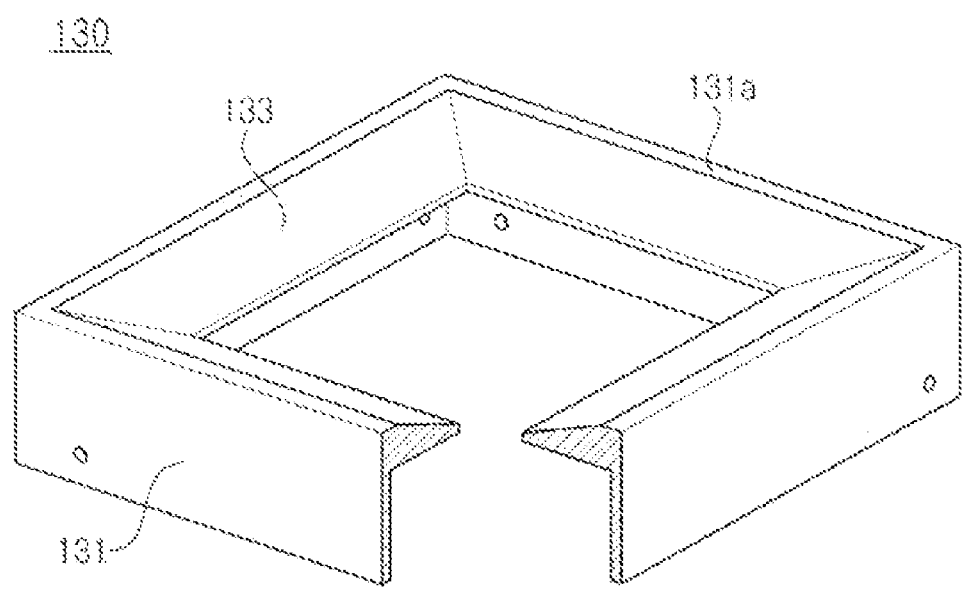
FIG. 5 is a perspective view of one example of an optical frame shown in FIG. 2.

Moreover, FIG. 4 is a sectional view taken along line B-B' of the display device shown in FIG. 2, and FIG. 5 is a perspective view of an optical frame shown in FIG. 2.

Referring to FIGS. 2-5, a display device 100 according to an embodiment of the present invention includes a display panel 110, backlight unit 120, and an optical frame 130. The optical frame 130 supports the display panel 110 and provides the light, transferred from the backlight unit 120, to a whole area of the display panel 110.

More specifically, the display panel 110 may include a first substrate 111 in which a Thin Film Transistor TFT may be disposed, a first polarization member 112 coupled to one side of the first substrate 111, a second substrate 113 in which a color filter may be disposed, and a second polarization member 114 connected to one side of the second substrate 113. A liquid crystal layer may be provided between the first substrate 111 and the second substrate 113.

Moreover, the display panel 110 may be connected to the optical frame 130 by using an adhesive member 116 such as an optical clear adhesive (OCA), a foam pad, or an elastic resin.

Moreover, the backlight unit 120 may include a light source part 121, a light guide panel 123, an optical sheet part 125 and a case 127.

In more detail, the light source part 121 may include a light emitting diode (LED) array 121a and a printed circuit board 121b.

Moreover, the light guide panel 123 may provide the light, transferred from the light source part 121, toward the display panel 110.

In more detail, the light guide panel 123 includes a light receiving part 123a which faces the light source part 121 and on which the light is incident, a non-light receiving part 123b which does not face the light source part 121, and a light outputting part 123c.

The light outputting part 123c of the light guide panel 123 is a portion in which the light moving inside the light guide panel 123 is outputted toward the display panel 110.

Moreover, the optical sheet part 125 may include a plurality of optical sheets which are provided on the light guide panel 123 and directs or diffuses the light transferred from the light guide panel 123 to the display panel 110, and may generally include a light direction sheet 125a or a diffusion sheet 125b.

Also, the case 127 may include an accommodating part 127a and a side part 127b.

In more detail, the accommodating part 127a accommodates the light source part 121, the light guide panel 123, and the optical sheet part 125, and the side part 127b may extend in a direction from the accommodating part 127a to the display panel 110.

For example, as shown in FIG. 3A, FIG. 3B, and FIG. 4, the side part 127b may be perpendicularly bent in a direction from an end portion of the accommodating part 127a to the display panel 110.

Moreover, the backlight unit 120 according to an embodiment of the present invention may further include a reflective sheet provided between the accommodating part 127a of the case 127 and the light guide panel 123 so as to re-reflect the light which is leaked toward a bottom of the light guide panel 123.

Moreover, the supporting member 127c may be provided in the accommodating part 127a of the case 127 such that the light source part 121 and the light receiving part 123a of the light guide panel 123 face each other.

As shown in FIG. 3A and FIG. 5, the optical frame 130 according to the embodiment of the present invention may include a panel supporting part 131 and a light diffusion part 133.

In more detail, the optical frame 130 may be formed of one of polycarbonate (PC), polymethylmethacrylate (PMMA), polystyrene (PS), poly ethylene terephthalate (PET), and meta styrene (MS). The optical frame 130 may additionally include a bead, and thus may further include a light diffusing function.

Moreover, the panel supporting part 131 is coupled to the side part 127b of the case 127 and may support the display panel 110.

In this case, a top of the panel supporting part 131 may be a horizontal surface 131a for supporting the display panel 110.

Also, the panel supporting part 131 and the case 127 may be connected by using a fixing member such as a screw (sS).

Moreover, in FIGS. 3A to 5, the panel supporting part 131 is coupled to the case 127 along an outer circumference surface of the side part 127b of the case 127, but the panel supporting part 131 may be coupled between the light source part 121 and the side part 127b of the case 127.

As shown in FIGS. 3A and 4, the light diffusion part 133 may extend from the panel supporting part 131 and may cover an edge of the light outputting part 123c of the light guide panel 123, namely, a portion of a top of the light guide panel 123.

The light diffusion part 133 may diagonally extend from the supporting part 131 to the light guide panel 123.

In addition, as shown in FIG. 3B, each of end parts 1231a and 1231b of the light receiving part 123a and the non-light receiving part 123b of the light guide panel 123 may match an end part 1331 of the light diffusion part 133.

To provide a summary, as shown in FIG. 3B, an end part of the light guiding panel 123 may match an end part 1331 of the light diffusion part 133, or as shown in FIG. 4, the end part of the light guiding panel 123 may be disposed inward (+X) from the end part 1331 of the light diffusion part 133.

That is, in the display device 100 according to the embodiment of the present invention, an optical distance D based on an expansion amount of the light guide panel 123 which is thermally expanded by the heat of the light source part 121 is freely designed within a size W of the light diffusion part 133.

Moreover, because a size of the light guide panel 123 is freely controlled within a size of the light diffusion part 133, the manufacturing cost of the backlight unit and the display device can be reduced.

Moreover, in the light diffusion part 133, an optical pattern (not shown) for diffusing light like a prism pattern may be disposed at one surface facing the display panel 110, namely, at a surface which is opposite to the display panel 110.

Figure 6:
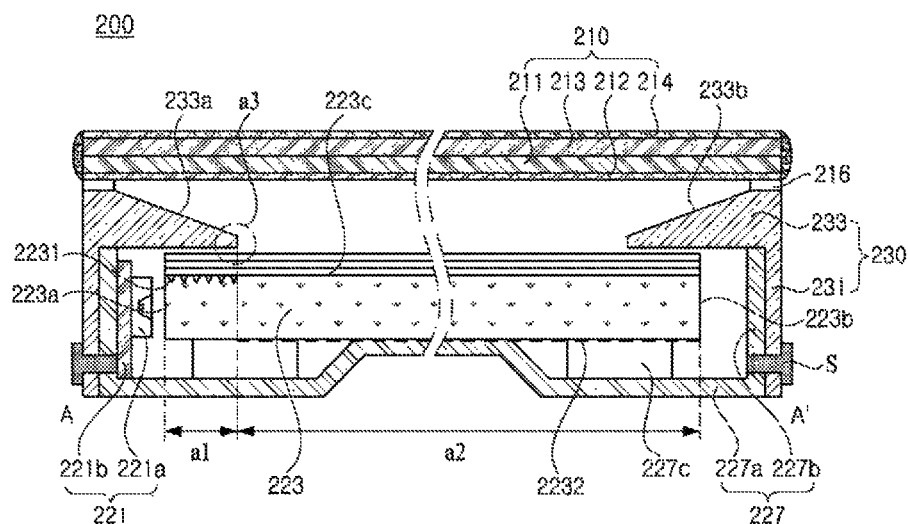
FIG. 6 is one example of a sectional view taken along line A-A' of a display device of FIG. 2 according to another embodiment of the present invention.
Figure 7:
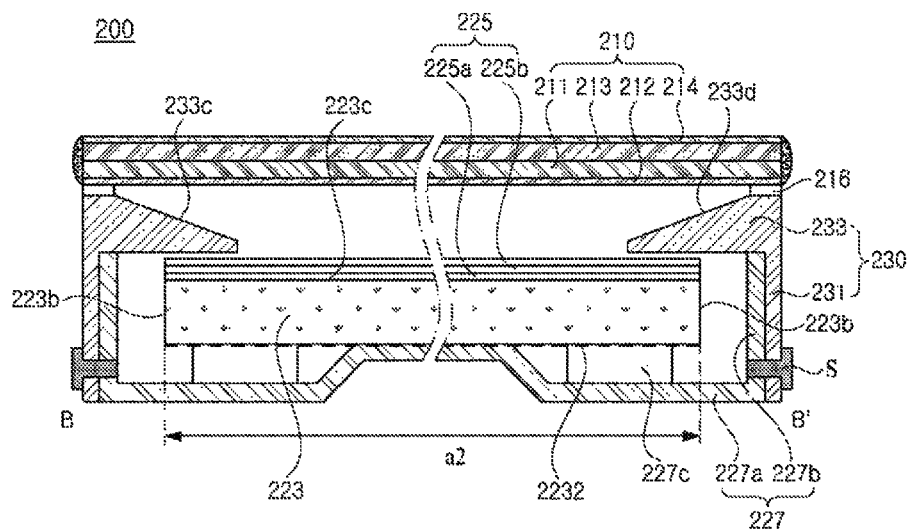
FIG. 7 is a sectional view taken along line B-B' of the display device shown in FIGS. 2 and 6.

FIG. 6 is a sectional view taken along line A-A' of a display device of FIG. 2 according to another embodiment of the present invention, and FIG. 7 is a sectional view taken along line B-B' of the display device shown in FIGS. 2 and 6 according to another embodiment of the present invention.

Figure 8:
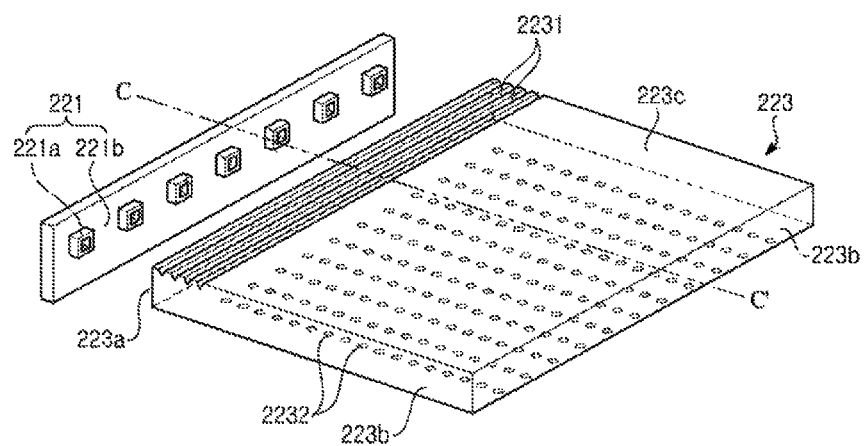
FIG. 8 is a schematic relationship diagram of a light source part and a light guide panel configuring the display device shown in FIG. 6.
Figure 9:
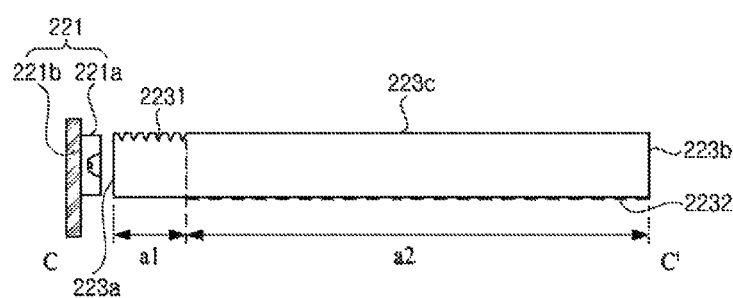
FIG. 9 is a sectional view taken along line C-C' of the light source part and the light guide panel shown in FIG. 8.

Moreover, FIG. 8 is a schematic relationship diagram of a light source part and a light guide panel configuring the display device shown in FIG. 6, and FIG. 9 is a sectional view taken along line C-C' of the light source part and the light guide panel shown in FIG. 8.

In describing an embodiment of the present invention, elements which are the same as or correspond to the elements of the preceding embodiment are not described. Hereinafter, the display device according to an embodiment of the present invention will be described.

More specifically, the display device 200 includes a display panel 210, a backlight unit 220, and an optical frame 230. Also, the optical frame 230 may support the display panel 210 and provide the light, transferred from the backlight unit 220, to a whole area of the display panel 210.

Also, the backlight unit 220 may include a light source part 221, a light guide panel 223, an optical sheet part 225, and a case 227.

Moreover, the optical frame 230 may include a panel supporting part 231 and a light diffusion part 233 identically to the optical frame 130 described above with reference to FIGS. 3A to 5.

To clarify a position of the light diffusion part 233 configuring the optical frame 230, the optical frame 230 is divided into a light diffusion part 233a in a direction of a light receiving part 223a facing the light source part 221 and light diffusion parts 233b, 233c and 233d in a direction of a non-light receiving part 223b which does not face the light source part 221.

Moreover, referring to FIGS. 6 to 9, the light guide panel 223 according to the present embodiment may include a groove pattern 2231 having a slit shape and a micro pattern 2232 having a dot shape.

In more detail, a plurality of the groove patterns 2231 may be disposed in a light outputting part 223c, which corresponds to the light diffusion part 223a provided in a direction of the light receiving part 223a, of the light guide panel 223, namely, a portion of an area of a top surface of the light guide panel 223.

Moreover, the groove pattern 2231 may be disposed in the light outputting part 223c of the light guide panel 223 to be parallel to an arrangement direction of the light source part 221, and the number, width, and depth of the pattern may be variously changed according to a design of the display device.

Moreover, the micro pattern 2232 may be provided to have a size 50 μm or more by using a roll stamping manufacturing method.

More specifically, the micro pattern 2232 may be disposed on a lower portion a2 of the light guide panel except a lower portion a1, which corresponds to the groove pattern 2231, of the light guide panel 223.

Therefore, a bright line and a reduction of an amount of light, which may occur in an end portion a3 of the light diffusion part 233a disposed in a direction of the light receiving part 223a facing the light source part 221, can be prevented by using the groove pattern 2231.

Also, a total amount of light transferred to the display panel 210 can increase by using the micro pattern 2232.

Figure 10:
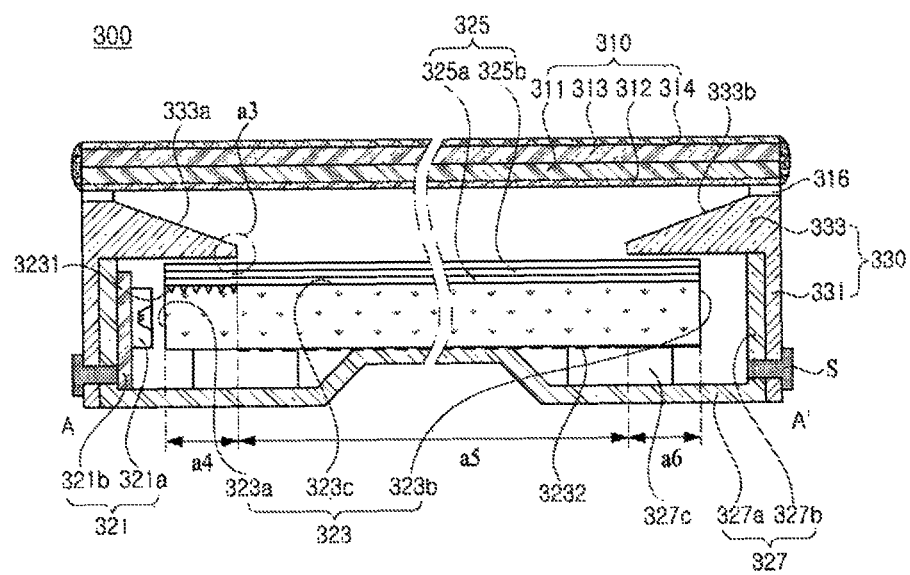
FIG. 10 is one example of a sectional view taken along line A-A' of a display device of FIG. 2 according to still another embodiment of the present invention.
Figure 11:
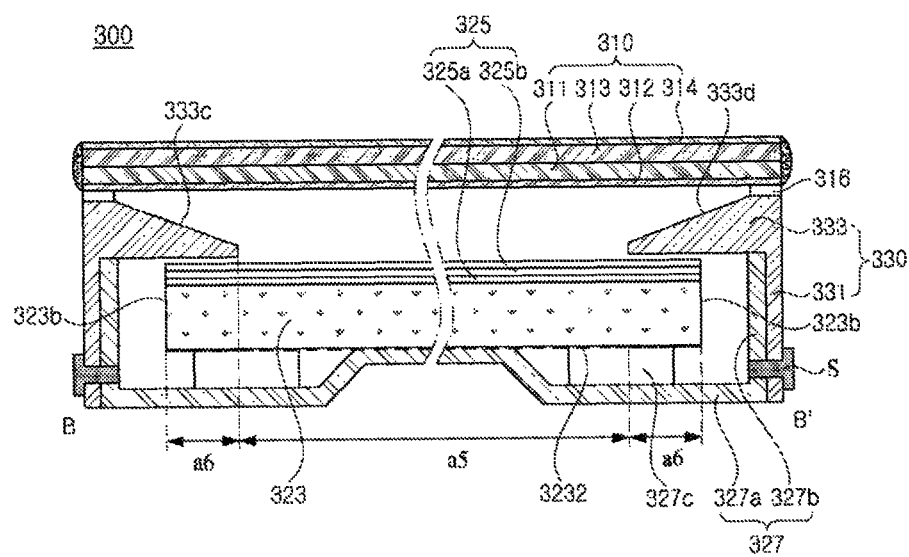
FIG. 11 is a sectional view taken along line B-B' of the display device shown in FIGS. 2 and 10.

FIG. 10 is a sectional view taken along line A-A' of a display device of FIG. 2 according to another embodiment of the present invention, and FIG. 11 is a sectional view taken along line B-B' of the display device shown in FIGS. 2 and 10 according to another embodiment of the present invention.

In describing an embodiment of the present invention, elements which are the same as or correspond to the elements of the preceding embodiment are not described.

Hereinafter, the display device according to an embodiment of the present invention will be described with reference to FIGS. 10 and 11.

More specifically, the display device 300 includes a display panel 310, a backlight unit 320, and an optical frame 330, and the optical frame 330 may support a display panel 310 and provide the light, transferred from the backlight unit 320, to a whole area of the display panel 310.

Also, the backlight unit 320 may include a light source part 321, a light guide panel 323, an optical sheet part 325, and a case 327.

Moreover, the optical frame 330 may include a panel supporting part 331, and an optical diffusion part 333 identically to the optical frame 130 described above with reference to FIGS. 3A to 5.

To clearly describe a position of the light diffusion part 333 configuring the optical frame 330, the optical frame 330 is divided into a light diffusion part 333a provided in a direction of a light receiving part 323a facing the light source part 321 and light diffusion parts 333b, 333c and 333d provided in a direction of a non-light receiving part 323b which does not face the light source part 321.

Also, referring to FIGS. 10 and 11, the light guide panel 323 according to the embodiment may include a groove pattern 3231 having a slit shape and a micro pattern 3232 having a dot shape.

More specifically, a plurality of the groove patterns 3231 may be disposed in a light outputting part 323c, which corresponds to the light diffusion part 333a provided in a direction of the light receiving part 323a, of the light guide panel 323, namely, a portion of an area of a top of the light guide panel 323.

Moreover, the groove pattern 3231 may be disposed in the light outputting part 323c of the light guide panel 323 to be parallel to an arrangement direction of the light source part 321, and the number, width, and depth of the pattern may be variously changed according to a design of the display device.

Moreover, a dot configuring the micro pattern 3232 may be provided to have a size of 50 μm or more by using a roll stamping manufacturing method.

More specifically, the micro pattern 3232 may be disposed in the other lower portions a5 and a6 of the light guide panel 323 except a lower portion a4, which corresponds to the groove pattern 3231, of the light guide panel 323.

For example, the micro pattern 3232 is disposed in the other lower portions a5 and a6 of the light guide panel 323 except the lower portion a4, which corresponds to the light diffusion part 333a provided in a direction of the light receiving part 323a, of the light guide panel 323.

Here, a density of the micro patterns 3232 disposed in a lower portion a6, which corresponds to the light diffusion parts 333b, 333c and 333d provided in a direction of the non-light receiving part 323b, of the light guide panel may be higher than a density of the micro patterns 3232 disposed in the other area a5.

As shown in FIG. 10, a density of the micro patterns 3232 disposed in a lower portion a6, which corresponds to the light diffusion parts 333b provided in a direction of the non-light receiving part, of the light guide panel may be higher than a density of the micro patterns 3232 disposed in the lower portion a5, which does not correspond to the light diffusion part 333a provided in a direction of the light receiving part 323a and the light diffusion part 333b provided in a direction of the non-light receiving part 323b, of the light guide panel 323.

Also, as shown in FIG. 11, a density of the micro patterns 3232 disposed in a lower portion a6, which corresponds to the light diffusion parts 333c and 333d provided in a direction of the non-light receiving part 323b, of the light guide panel may be higher than a density of the micro patterns 3232 disposed in the lower portion a5, which does not correspond to the light diffusion part 333c and 333d, of the light guide panel 323.

Therefore, a bright line and a reduction of an amount of light, which occur in an end portion a3 of the light diffusion part 333a provided in a direction of the light receiving part 323a facing the light source part 321, can be prevented by using the groove pattern 3231.

Also, a total amount of light transferred to the display panel 310 can increase by using the micro pattern 3232.

Moreover, an amount of light transferred to the optical frame 330 can increase by using the micro pattern 3232 densely formed in a lower portion a6, which corresponds to the light diffusion parts 333b, 333c and 333d provided in a direction of the non-light receiving part 323b, of the light guide panel 323.

Figure 12:
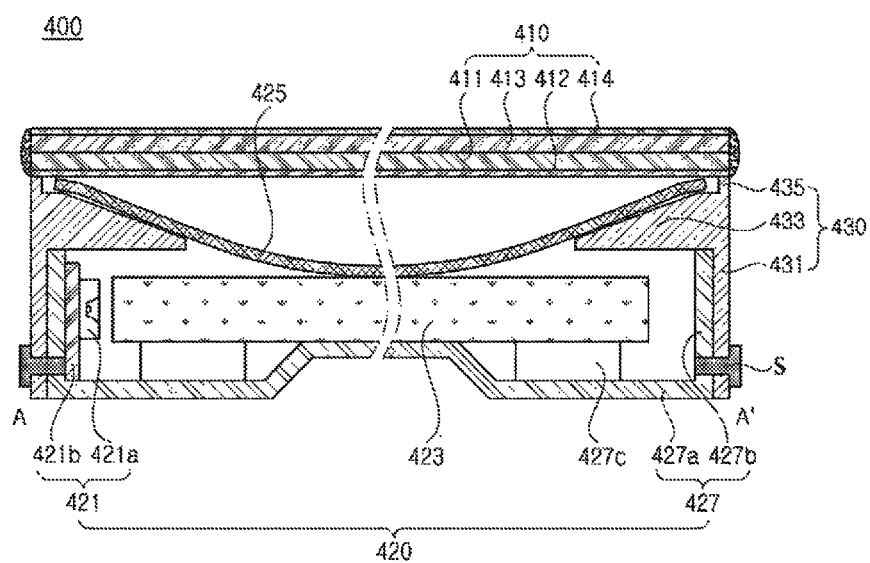
FIG. 12 is one example of a sectional view taken along line A-A' of a display device of FIG. 2 according to yet another embodiment of the present invention.

FIG. 12 is a sectional view taken along line A-A' of a display device of FIG. 2 according to another embodiment of the present invention. In describing an embodiment of the present invention, elements which are the same as or correspond to the elements of the preceding embodiment are not described. Hereinafter, the display device according to the embodiment of the present invention will be described with reference to FIG. 12.

More specifically, the display device 400 includes a display panel 410, a backlight unit 420, and an optical frame 430, and the optical frame 430 may support a display panel 410 and provide the light, transferred from the backlight unit 420, to a whole area of the display panel 410.

Moreover, the backlight unit 420 may include a light source part 421, a light guide panel 423, an optical sheet part 425, and a case 427.

The optical frame 430 may further include a panel supporting part 431, a light diffusion part 433, and a stepped portion 435.

More specifically, the stepped portion 435 may be formed between the panel supporting part 431 and the light diffusion part 433, and an optical sheet part 425 may be coupled to the stepped portion 435.

For example, the optical sheet part 425 configured with a light direction sheet or a diffusion sheet is provided on a top portion of the light diffusion part 433 of the optical frame 430, and thus, an amount of light transferred to the display panel 410 can increase.

Also, the light guide panel 423 may include a groove pattern (not shown) and a micro pattern (not shown) having a dot shape identically to the light guide panel 223 described above with reference to FIGS. 6 and 7.

Moreover, the light guide panel 423 may include a groove pattern (not shown) and a micro pattern (not shown) having a dot shape identically to the light guide panel 323 described above with reference to FIGS. 10 and 11.

That is, micro patterns may be densely formed in a lower portion, which corresponds to a light diffusion part provided in a direction of a non-light receiving part, of the light guide panel 423.

Figure 13:
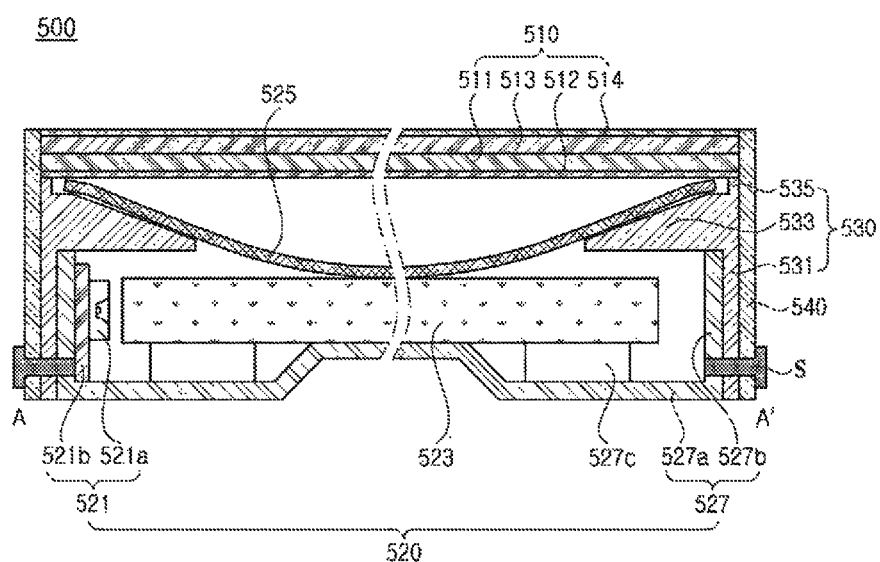
FIG. 13 is one example of a sectional view taken along line A-A' of a display device of FIG. 2 according to still another embodiment of the present invention.

FIG. 13 is a sectional view taken along line A-A' of a display device of FIG. 2 according to another embodiment of the present invention.

In describing an embodiment of the present invention, elements which are the same as or correspond to the elements of the preceding embodiment are not described.

Hereinafter, the display device according to the embodiment of the present invention will be described with reference to FIG. 13.

More specifically, the display device 500 includes a display panel 510, a backlight unit 520, an optical frame 530, and a reinforcing member 540, and the optical frame 530 may support a display panel 510 and provide the light, transferred from the backlight unit 520, to a whole area of the display panel 510.

Moreover, the backlight unit 520 may include a light source part 521, a light guide panel 523, an optical sheet part 525, and a case 527.

Moreover, the optical frame 530 may include a panel supporting part 531, an optical diffusion part 533, and a stepped portion 535.

More specifically, the stepped portion 535 may be formed between the panel supporting part 531 and the light diffusion part 533, and an optical sheet part 525 may be coupled to the stepped portion 535.

For example, the optical sheet part 525 configured with a light direction sheet or a diffusion sheet is provided on a top portion of the light diffusion part 533 of the optical frame 530, and thus, an amount of light transferred to the display panel 510 can increase.

Also, the light guide panel 523 may include a groove pattern (not shown) and a micro pattern (not shown) having a dot shape identically to the light guide panel 223 described above with reference to FIGS. 6 and 7.

Moreover, the light guide panel 523 may include a groove pattern (not shown) and a micro pattern (not shown) having a dot shape identically to the light guide panel 323 described above with reference to FIGS. 10 and 11.

That is, micro patterns may be densely formed in a lower portion, which corresponds to a light diffusion part provided in a direction of a non-light receiving part, of the light guide panel 523.

Moreover, the reinforcing member 540 is coupled to the optical frame 530 along an outer circumference of the optical frame 530, thereby protecting the display panel 510 and the optical frame 530 from the outside.

According to one or more embodiments of the present invention, an active area of a display device is enlarged, and thus, a zero bezel is realized.

Moreover, according to one or move embodiments of the present invention, since a guide panel or a case top used in a related art backlight unit is removed, a display device is thinned, and thus, the manufacturing cost can be reduced.

Moreover, since a size of a light guide panel is reduced by using an optical frame according to one or more embodiments of the present invention, an optical distance between a light source part and a light guide panel can be secured, and thus, the manufacturing cost can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
   a display panel;
   a backlight unit providing light in a direction of the display panel, the back light unit including a light guide panel and optical sheets on the light guide panel; and
   an optical frame supporting the display panel,
   wherein the optical frame includes:
      a panel supporting part configured to support the display panel, and
      a light diffusion part extended from the panel supporting part and disposed on the optical sheets for fixing the optical sheets, the light diffusion part being configured to provide light from the backlight unit to a whole area of the display panel,
   wherein an outer circumference surface of the panel supporting part of the optical frame is substantially aligned with a side surface of the display panel,
   wherein the light guide panel comprises:
      a light receiving part facing a light source part, wherein the light is incident on the light receiving part;
      a non-light receiving part that does not face the light source part; and
      a light outputting part providing the light toward the display panel,
   wherein the light diffusion part covers an edge of the light outputting part, and
   wherein in the light guide panel, a plurality of groove patterns are disposed in a portion of the light outputting part corresponding to the light diffusion part provided in a direction of the light receiving part.

2. The display device of claim 1, wherein the optical frame is formed of one of polycarbonate (PC), polymethylmethacrylate (PMMA), polystyrene (PS), poly ethylene terephthalate (PET), and meta styrene (MS).

3. The display device of claim 2, wherein the optical frame comprises a diffusion bead.

4. The display device of claim 1, wherein the backlight unit comprises:
   a light source part;
   the light guide panel providing light, transferred from the light source part, toward the display panel;
   an optical sheet part coupled to one side of the light guide panel and configured to direct or diffuse the light, the optical sheet part including the optical sheets; and
   a case configured to comprise an accommodating part, which accommodates the light source part, the light guide panel and the optical sheet part, and a side part which extends in a direction from the accommodating part to the display panel.

5. The display device of claim 4, wherein,
   the optical frame further comprises a stepped portion provided between the panel supporting part and the light diffusion part, and
   the optical sheet part is coupled to the stepped portion.

6. The display device of claim 5, further comprising a reinforcing member coupled to the optical frame along an outer circumference of the optical frame.

7. The display device of claim 4, wherein in the light diffusion part, an optical pattern is disposed in one surface facing the display panel.

8. The display device of claim 1, wherein the panel supporting part comprises a horizontal plane for supporting the display panel.

9. The display device of claim 1, wherein the plurality of groove patterns are disposed in a portion of the light outputting part to be parallel to an arrangement direction of the light source part.

10. The display device of claim 1, wherein a micro pattern is disposed in a lower portion of the light guide panel except a lower portion of the light guide panel in which the plurality of groove patterns are disposed.

11. The display device of claim 10, wherein a density of the micro pattern disposed in the lower portion, which corresponds to the light diffusion part provided in a direction of the non-light receiving part, of the light guide panel is higher than a density of micro patterns disposed in the other portions.

12. The display device of claim 1, wherein each of end parts of the light receiving part and the non-light receiving part matches an end part of the light diffusion part, or is disposed inward from the end part of the light diffusion part.

13. A display device comprising:
   a display panel;
   a backlight unit including a light guide panel and optical sheets on the light guide panel, the backlight unit being configured to provide light in a direction of the display panel; and
   an optical frame including:
   a horizontal part configured to support the display panel,
   a vertical part connected to the horizontal part, and
   a slanted part extended from the vertical part and disposed on the optical sheets for fixing the optical sheets, the slanted part being configured to diffuse light from the backlight unit to a whole area of the display panel.

14. The display device of claim 13, wherein the optical frame includes a diffusion bead.

15. The display device of claim 13, wherein the slanted part covers an edge of a light outputting part of the light guide panel, and the light outputting part provides light toward the display panel.

\* \* \* \* \*